United States Patent [19]
Guinn et al.

[11] Patent Number: 5,906,089
[45] Date of Patent: May 25, 1999

[54] SLAVE CYLINDER STABILIZER FOR HARVESTER HEADER

[75] Inventors: Ronald K. Guinn, Valley Center; James W. Schroeder, Newton; Michael O'Halloran, Hesston, all of Kans.

[73] Assignee: Hay & Forage Industries, Hesston, Kans.

[21] Appl. No.: 08/896,178

[22] Filed: Jul. 17, 1997

[51] Int. Cl.⁶ .......................... A01D 47/00; A01D 75/28
[52] U.S. Cl. .................. 56/10.2 E; 56/DIG. 15; 60/472
[58] Field of Search ............. 56/10.2 E, 10.2 D, 56/10.2 F, 10.2 R, DIG. 15; 60/470, 472

[56] References Cited

U.S. PATENT DOCUMENTS

| | | | |
|---|---|---|---|
| 3,604,205 | 9/1971 | Geselbracht et al. | 60/472 |
| 3,717,995 | 2/1973 | Case | 60/470 |
| 4,622,803 | 11/1986 | Lech | 56/10.2 E |
| 5,415,586 | 5/1995 | Hanson et al. | 56/10.2 E X |

OTHER PUBLICATIONS

MacDon Operator's Manual for Model 9200/9300 Self-Propelled Windrower; Front and Back Cover, pp. 86–87 (Oct. 1995).

*Primary Examiner*—Terry Lee Melius
*Attorney, Agent, or Firm*—Hovey, Williams, Timmons & Collins

[57] ABSTRACT

The windrower or other harvester has a hydraulic lift circuit for its header that includes a pair of double-acting cylinders which operate in concert to raise the header and provide a solid, lower limit for downward swinging of the header. The two cylinders are connected to one another in a master-slave relationship, and the slave cylinder has its return line normally blocked by a one-way check valve so that a body of fluid is trapped against the piston of the slave cylinder during field operations. This stabilizes the two cylinders to reduce header bounce.

10 Claims, 2 Drawing Sheets

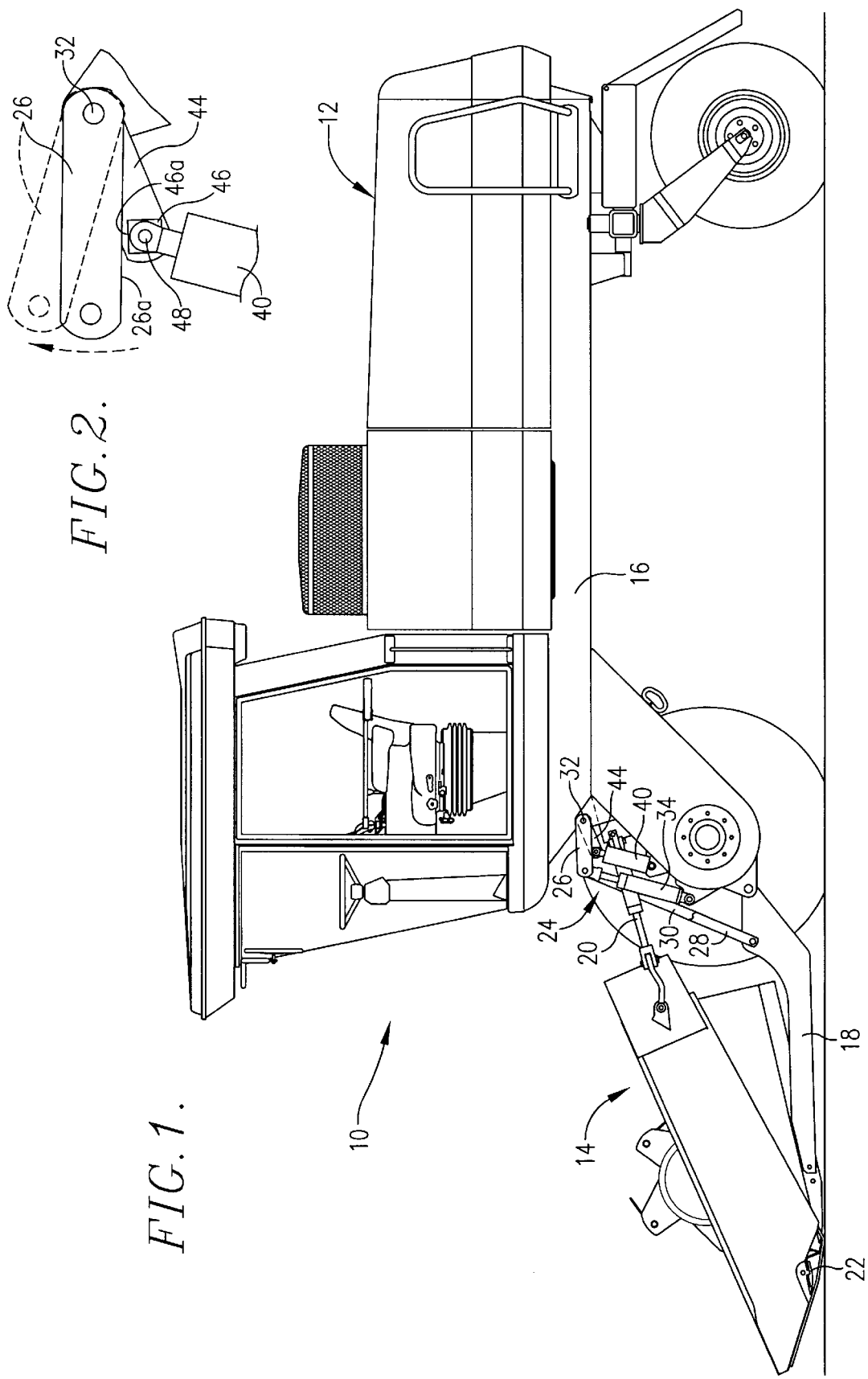

SLAVE CYLINDER STABILIZER FOR HARVESTER HEADER

CROSS-REFERENCE TO RELATED APPLICATION

This application is related to contemporaneously filed application Ser. No. 08/895,684 titled "Dual Accumulator Hydraulic Flotation System for Crop Harvester."

TECHNICAL FIELD

This invention relates to harvesters of the type having a header supported on the frame of the implement and capable of being raised and lowered hydraulically relative to the frame, such as when the harvester turns around at the end of a row or the header needs to be supported at a certain height above the ground for severing the standing crop at a certain selected height.

BACKGROUND

It is a common feature on harvesters such as windrowers to have a hydraulic lift system that enables the operator to raise the header into a transport position for turning around at the end of a row. On self-propelled machines, it is also common practice to provide a hydraulic flotation system that carries much of the weight of the header as the machine moves across a field so that the header only lightly skims the ground and can easily be pushed upwardly by rises in the ground to the extent necessary to clear such changes in contour.

In the past, self-propelled windrowers have typically been provided with a pair of single-acting cylinders for lifting opposite ends of the header. The two lift cylinders are plumbed in parallel and each has a single hydraulic line supplying one end of the cylinder with pressurized fluid, the other end being vented to the atmosphere. As the machine moves through the field of standing crop, the weight of the header is partially borne by the lift cylinders, which provide a solid "floor" or "base" that prevents the header from swinging down below a certain height. The degree to which the cylinder remains extended thus determines the cut-off height for the header, which can float up from the cut-off height due to the assistance of the flotation cylinders when uneven terrain is encountered.

Problems can arise with this arrangement in rough fields, however. Because the lift cylinders are single-acting, there is nothing pushing down on the pistons of the cylinders as the machine moves across the field. Consequently, the pistons have a tendency to bounce when rough spots are encountered by the tractor, causing the header to bounce as well. This can produce an uneven, ragged cut.

SUMMARY OF THE PRESENT INVENTION

Accordingly, one important object of the present invention is to provide a way of reducing header bounce during harvesting operations. More particularly, an important object is to provide a way of stabilizing the lift cylinders of the header so that their pistons remain stationary and free of bounce during operation of the machine. At the same time, it is important to provide an improvement to previous lift cylinder arrangements which does not in any way detract from or interfere with the hydraulic flotation system that may be associated with the harvester.

The foregoing and other important objects of the invention are achieved by making both cylinders of the lift system double-acting and by connecting them in a master-slave arrangement wherein the return line from the slave cylinder has fluid trapped therein during cutting operations so as to hold the pistons stationary. A normally closed check valve traps the fluid in the return line unless the check valve is intentionally opened by the operator when it is time to raise or lower the header.

The mechanical linkage between the frame and the header rests upon pads associated with the lift cylinders without being positively connected to the cylinders. However, because the flotation cylinders are positively connected to the linkage, the flotation cylinders are extended by the header as it follows rises in the terrain.

BRIEF DESCRIPTION OF THE DRAWINGS

FIG. 1 is a side elevational view of a self-propelled windrower with the near ground wheel removed and having header control apparatus that incorporates the principles of the present invention;

FIG. 2 is an enlarged, fragmentary side elevational view of the lift linkage for the header illustrating the manner in which the cylinders of the present invention provide underlying support for such linkage without being directly mechanically connected thereto.

DETAILED DESCRIPTION

Figure 3:
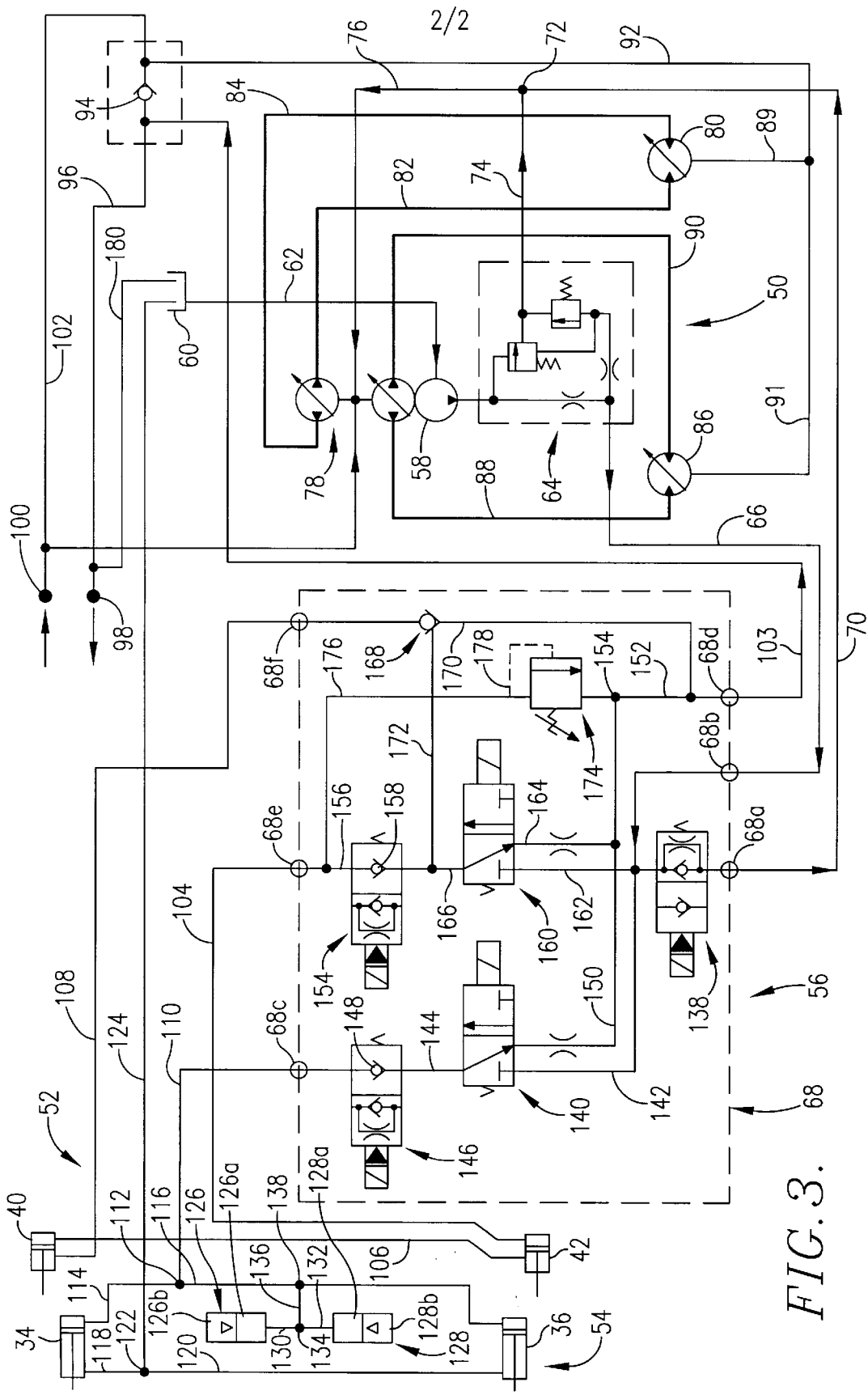
FIG. 3 is schematic diagram of the hydraulic circuit associated with the header control apparatus.

FIG. 1 shows the present invention utilized in connection with a self-propelled windrower 10. However, it will be appreciated that the principles of the present invention are not limited to a windrower that is self-propelled, or to any specific type of harvester.

In the illustrated embodiment, the self-propelled windrower 10 includes a tractor 12 and a header 14, the header 14 being attached to the front end of the frame 16 or chassis of the tractor 12. Such attachment of the header 14 to the frame 16 is achieved through a pair of lower arms 18 (only one being shown) pivoted at one end to the frame 16 and at the other end to the header 14, as well as through a central upper link 20. The link 20 may take the form of a double-acting hydraulic cylinder whose extension and retraction is controlled by the operator at the tractor seat to remotely control the guard angle at the sickle 22 on the front of the header 14.

Header control apparatus broadly denoted by the numeral 24 is connected between the frame 16 and the lower lift arms 18 for controlling the height of the header 14. Such apparatus 24 includes lift linkage that comprises a pair of upper, fore-and-aft links 26 (only one being shown) on opposite sides of the tractor 12. Such linkage also includes a pair of upwardly and rearwardly inclined tension links 28 and 30 that operably interconnect the forward ends of the upper links 26 with the two support arms 18. The upper links 26 are pivotally connected to the frame 16 at respective pivots 32.

The apparatus 24 further includes a pair of flotation cylinders 34 and 36 (see also FIG. 3) that are connected between the frame 16 and their respective upper links 26. The point of connection of the flotation cylinders 34 and 36 to the links 26 is typified by the pivot 38.

The apparatus 24 additionally includes a pair of lift cylinders 40 and 42 (see also FIG. 3) for raising and lowering the header 14 and for establishing the cutting height. The cylinders 40 and 42 are anchored at one end to the frame 16 and are pivotally connected at their opposite ends to a corresponding pair of short links 44 (only one being shown). The short links 44 are connected to the frame 16 for rotation about the same pivot axis 32 as the upper lift links 26, but the short links 44 are not fixed to the links 26. As illustrated particularly in FIG. 2, each of the short links 44 has support structure in the form of a square pad 46 that is bolted to the link 44 at the pivot connection 48 of the cylinder 40 to the link 44. The upper flat edge 46a of the pad 46 is disposed to underlie and engage the lower edge 26a of the upper lift link 26 so as to provide a rest or stop for the link 26. The link 26 is not secured to the pad 46 and can rise upwardly therefrom as illustrated in phantom lines in FIG. 2.

The flotation cylinders 34, 36 and the lift cylinders 40, 42 comprise part of a hydraulic system illustrated schematically in FIG. 3. In the illustrated embodiment, the hydraulic system is mounted entirely on the tractor 12, although the principles of the present invention are not limited to having the circuit located entirely on the tractor.

The hydraulic system illustrated in FIG. 3 broadly includes a charge circuit 50, a lift circuit 52 (of which the cylinders 40 and 42 comprise a part), a flotation circuit 54 (of which the cylinders 34 and 36 comprise a part), and a control system 56 that is functionally interposed between the circuits 52, 54 on the one hand and the charge circuit 50 on the other hand.

Dealing first with the charge circuit 50, it will be seen that a charge pump 58 draws hydraulic fluid from a reservoir 60 through a line 62. From the charge pump 58, fluid passes through a flow control circuit 64 to a line 66 leading to the control system 56, which may be contained within a single valve block 68. A return line 70 from a port 68a of the valve block 68 leads back to a junction 72 with a line 74 from the flow control circuit 64. The fluid then travels via line 76 to a tandem pump 78 to provide charge flow.

In pull-type harvesters the tandem pump 78 and other additional components of the charge circuit 50 described hereinafter will not be utilized. However, in the illustrated self-propelled embodiment the tandem pump 78 and its other associated components are necessary. Thus, the tandem pump 78 supplies fluid to the right wheel drive motor 80 via a line 82, whereupon the fluid is returned via a line 84. Similarly, the tandem pump 78 supplies fluid to the left wheel drive motor 86 via a line 88, whereupon the fluid is returned via a line 90. The wheel drive motors 80 and 86 have respective lines 89 and 91 that connect with a common line 92 leading to a bypass valve 94. At the valve 94 a line 96 leads to a fitting 98 or hydraulic coupling which may be connected with a hose (not shown) leading to hydraulic pumps and motors (not shown) on the header for driving its operating components. A similar fitting 100 or hydraulic coupling serves as a return connection for fluid from the components on the header and is at the end of a return line 102 leading to the bypass valve 94. A return line 103 from the control system 56 also connects to the line 96 on the downstream side of the bypass valve 94.

The header lift circuit 52 includes the two lift cylinders 40 and 42. The cylinders 40 and 42 are connected in a master-slave arrangement, with the cylinder 42 being the master and the cylinder 40 being the slave. In addition to the cylinders 40 and 42, the lift circuit also includes a line 104 leading from the control system 56 to the base end of the master cylinder 42, an interconnecting line 106 leading from the rod end of the master cylinder 42 to the base end of the slave cylinder 40, and a return line 108 leading from the rod end of the slave cylinder 40 to the control system 56. The cylinders 40, 42 have matched displacements so that the chamber in the rod end of the master matches the volume of the chamber in the base end of the slave cylinder 40.

The flotation circuit 54 includes the flotation cylinders 34 and 36. Additionally, the circuit includes a supply line 110 leading from the control system 56 to a junction 112. At the junction 112 the supply line 110 connects to a pair of branch lines 114 and 116 leading to the anchor ends of the two flotation cylinders 34 and 36, respectively. Individual return lines 118 and 120 from the rod ends of the flotation cylinders 34 and 36, respectively, connect at a junction 122 with a common return line 124 leading to the reservoir.

In addition to the cylinders 34, 36 and their various flow lines, the flotation circuit 54 also includes a pair of pre-charged accumulators 126 and 128 that are connected in open fluid communication with the anchor ends of the flotation cylinders 34 and 36 so as to provide flotation support for the header 14 through the cylinders 34, 36. In this respect, the accumulator 126 has a line 130 leading from the hydraulic chamber 126a thereof, while the accumulator 128 has a line 132 leading from its hydraulic chamber 128a. The two lines 130 and 132 have a junction 134 with a common line 136 which connects with the line 116 at a junction 138. Thus, the anchor ends of the flotation cylinders 34, 36 and the chambers 126a and 128a of the accumulators 126 and 128 are all in open communication with one another.

Preferably, the two accumulators are gas-pressure charged, although in theory the precharging could be achieved by other means such as mechanical springs or the like. In the illustrated embodiment the precharge chamber 126b of the accumulator 126 is provided with gas that is precharged to a lower pressure than the gas in chamber 128b in accumulator 128. For example, the accumulator 126 may be precharged to a pressure of 800 psi, while the accumulator 128 may be precharged to a pressure of 1200 psi. Gas-precharged, piston-type accumulators suitable for use as the accumulators 126 and 128 are well-known by those skilled in the art and are readily available from a number of sources.

The control system 56 includes a number of specially plumbed, solenoid-actuated control valves, check valves and orifices. In this regard, a normally open solenoid-actuated control valve 138 within the valve block 68 allows fluid from the supply line 66 of the charge circuit 50 to loop back to the charge pump 58 via port 68b and port 68a when the valve 138 is in the position illustrated in FIG. 3. On the other hand, the internal check within the control valve 138 precludes flow from the line 70 through the valve 138 when the valve 138 is in its FIG. 3 position. When shifted to the right from its FIG. 3 position, the control valve 138 closes the return line 70 against return flow from the valve block to the charge circuit 50, forcing pressurized fluid from the line 66 to go to other parts of the control system 56.

The control system 56 also includes a solenoid-actuated control valve 140 that controls access by the flotation cylinders 34, 36 to pressurized fluid entering the valve block 68 via the charge line 66. The two-position, normally closed valve 140 has access to the charge line 66 via an internal passage 142 in the block 68. The passage 142 connects with the line 66 at a port 68b in the valve block. When the control valve is in the FIG. 3 position, the passage 142 is blocked from communicating with the line 110 that connects to the valve block 68 at port 68c. However, when the control valve 140 is shifted leftwardly into its open position, the passage 142 communicates with an internal passage 144 leading to the port 68c, thus establishing a flow path for pressurized fluid to the flotation circuit.

The control system 56 further includes a solenoid-actuated control valve 146 that is normally open in the sense of permitting pressurized fluid to flow through the passage 144 toward the flotation circuit 54. The control valve 146 has an internal check 148 that prevents retrograde fluid flow from the line 110 when the control valve 146 is in its FIG. 3 position. When the control valve 146 is shifted rightwardly, it opens the line 110 to retrograde flow so as to decrease the flotation lift provided by the cylinders 34 and 36. When the control valve 146 is shifted rightwardly from its FIG. 3 position and the valve 140 remains in its FIG. 3 position, a return flow path is created via the internal passage 144, the valve 140, an internal passage 150, and internal passage 152 connected with the passage 150 at junction 154, and return line 103 that connects with the passage 152 at port 68d in the valve block.

The control system further includes a solenoid-actuated control valve 154. In the FIG. 3 position the control valve 154 closes an internal passage 156 against fluid flow in a direction toward the return line 103, such closing being accomplished via an internal check 158. A passage 156 communicates with the line 104 leading to master lift cylinder 42 via a port 68e in the valve block. When the valve 154 is shifted rightwardly from its FIG. 3 position, the line 104 can be connected to the return line 70, depending upon the position of a fifth solenoid-actuated control valve 160 and the position of the control valve 138. A passage 162 interconnects the control valve 160 and the control valve 138.

The fifth control valve 160 of the system 56 blocks communication between the passages 156 and 162 when the valve 160 is in the FIG. 3 position. The valve 160 does communicate with the line 150 at this time, however, via internal passage 164. When the control valve 160 is shifted leftwardly, communication is established between the passage 162 and another passage 166 that interconnects the valves 154 and 160.

The control system 56 also includes a pilot-operated check valve 168 within a passage 170 connecting at one end to the passage 152 and at the other end to the slave cylinder return line 108 via a port 68f in the valve block. The check valve 168 is arranged to block return flow of the slave cylinder 40 via the line 108 when the lift cylinders 40 and 42 are holding at a selected degree of extension. Thus, fluid is trapped in the rod end of the slave cylinder 40 at this time. However, the check 168 can be opened at the appropriate time via a pilot passage 172 leading from the passage 166 to the check valve 168. When passage 166 contains pressurized fluid, such fluid is communicated to the check valve 168 via the passage 172 to unseat the check valve and communicate the return line 108 with the return line 103.

In addition, the control system 56 includes a relief valve 174 disposed within a passage 176 that interconnects the passages 156 and 152. The relief valve 174 normally closes the passage 176 against communication with the return line 103 via passage 152. However, when the pressure in relief passage 176 reaches a certain predetermined level, a pilot passage 178 opens the valve 174 to allow fluid to pass over relief. As is well understood by those skilled in the art, the relief valve 174 may be adjusted so as to provide for an adjustable setting of the relief pressure.

The control valves 154 and 160 control the lift cylinders 40 and 42, while the control valves 140 and 146 control the flotation cylinders 34 and 36. The control valve 138 remains in its FIG. 3 position unless the lift circuit 52 or the flotation circuit 54 is being pressurized.

With respect to its lifting control function, the control system 56 is adapted to be placed in either LIFT, HOLD, or LOWER modes by the operator at the tractor seat. In the LIFT mode of system 56, valve 138 is shifted to the right, valve 160 is shifted to the left, and valve 154 and the check valve 168 are left in their FIG. 3 positions. This closes the return line 70 and establishes a charge pressure flow path between the charge pump 58 and master lift cylinder 42 along line 66, port 68b, passage 162, passage 166, internal check 158 of control valve 154, passage 156, port 68e and line 104. Because there is lift pressure in passage 166 at this time, check valve 168 is opened via pilot passage 172 to present a return flow path between slave 40 and the reservoir 60 along line 108, port 68f, passage 170, open check 168, passage 152, port 68d, line 103, bypass valve 94, line 96, and a return line 180. Consequently, fluid can be displaced from the rod end of the master 42 to the anchor end of the slave 40 and the lift cylinders 40 and 42 extend until the system goes over relief or is taken out of the LIFT mode.

In the HOLD mode of the control system 56, the control valves 138, 154 and 160 and check valve 168 are all disposed in their FIG. 3 positions. In this mode of the system, fluid from the charge pump 58 simply travels in a closed loop without causing extension or retraction of the lift cylinders 40, 42. With control valve 160 in its FIG. 3 position, fluid at charge pressure from the supply line 66 and passage 162 cannot get past the valve 160. Consequently, fluid at charge pressure simply bypasses the cylinders 40, 42 along a path that includes the line 66, port 68b, passage 162, the open check in control valve 138, port 68a, return line 70, junction 72, and line 76. Furthermore, the check 158 in control valve 154 traps fluid in line 104 to prevent retraction of the master cylinder 42 and the slave cylinder 40, while the check valve 168 in passage 170 traps fluid in line 108 to prevent extension of the cylinders 40 and 42. Because there is no charge pressure in pilot passage 172, check valve 168 remains closed in its FIG. 3 position.

In the LOWER mode of the system 56, the control valves 138 and 160 remain in their FIG. 3 positions, while the control valve 154 is shifted to the right and the check valve 168 becomes unseated. This allows fluid from the anchor end of the master cylinder 42 to return to the reservoir 60 along a path that includes line 104, port 68e, passage 156, open valve 154, passage 166, valve 160, passage 164, passage 150, junction 154, passage 152, port 68d, line 103, bypass valve 94, line 96, and line 180. As master cylinder 42 retracts, fluid from the anchor end of slave cylinder 40 displaces to the rod end of master 42 via line 106. Furthermore, as the weight of the header retracts the cylinders 40 and 42, a suction pressure is created in the rod end of slave cylinder 40 and line 108 to open check valve 168. This has the effect of drawing fluid into line 108 and the rod end of slave cylinder 40 via the passage 170.

With respect to the flotation control function of the system 56, the system may be placed in INCREASE, MAINTAIN, or DECREASE modes. In the INCREASE mode of the system, the control valve 138 is shifted to the right to close off the return line 70, the valve 140 is shifted to the left to communicate passage 142 with passage 144, and the control valve 146 is retained in its FIG. 3 position. This introduces fluid at operating pressure to the anchor ends of the flotation cylinders 34 and 36 along a path that includes the line 66, port 68b, passage 142, open valve 140, passage 144, open check 148 within valve 146, port 68c, line 110, junction 112, and lines 114, 116. The rod ends of the flotation cylinders 34, 36 do not contain oil, except to the extent that leakage has occurred past the pistons. Leakage fluid from the rod ends of the flotation cylinders 34, 36 returns to the reservoir along a path that includes lines 118 and 120, junction 122, and return line 124. Line 124 communicates with the reservoir 60 above oil level.

In the MAINTAIN mode of the system, the control valves 138, 140 and 146 all remain in their FIG. 3 positions. This traps fluid between the anchor ends of the flotation cylinders 34, 36 and the internal check 148 of control valve 146. Fluid from the rod ends of the flotation cylinders can be displaced to the reservoir along line 124 by the header when it is moved upwardly by rises in the terrain. Fluid at charge pressure simply circulates in a loop along a path that includes the line 66, port 68b, open valve 138, port 68a, return line 70, junction 72, and line 76.

In the DECREASE mode of the system, the control valve 146 is shifted to the right while the control valves 138 and 140 remain in their FIG. 3 positions. This opens up a return flow path from the anchor ends of the flotation cylinders 34, 36 that includes the lines 114, 116, junction 112, line 110, port 68c, open control valve 146, passage 144, control valve 140, passage 150, junction 154, passage 152, port 68d, line 103, bypass valve 94, line 96, and line 180.

OPERATION

As the windrower 10 moves through the field of standing crop, the cutting height of the header 14 is determined by the degree of extension of the lift cylinders 40 and 42. The greater the extension of the cylinders, the higher the links 26 are lifted by the pads 46 that underlie the links 26, thus lifting the header 14 to a corresponding position. Regardless of the selected height, however, the flotation cylinders 34 and 36 provide constant upward biasing force sufficient to enable the header to be raised easily by bumps and rises in the terrain as the machine moves along. The fact that the links 26 merely rest on the pads 46 instead of being fixed thereto allows the header to easily move the links 26 up and off the pads as rises are encountered.

The float cylinders 34 and 36 are sized to carry most of the weight of the header 14 during operation, leaving only a relatively small amount to be handled by the lift cylinders 40 and 42 when it is time to raise the header 14 at the end of a row or for over-the-road transport. Thus, the lift cylinders 40 and 42 can be considerably smaller than the flotation cylinders 34 and 36. This permits the header to be raised quickly when the hydraulic control system 56 is placed in the LIFT mode, since the lift cylinders 40 and 42 will fill quickly.

It will be appreciated that because the lift cylinders 40 and 42 are connected in a master-slave arrangement and the return line 108 from the slave 40 is normally closed by the check valve 168, fluid is trapped within the flow path defined by the line 108 when the control system is in the HOLD mode during normal cutting operation. This means that the piston within the slave 40 is held down against extending at such time, even though the tractor might bounce along over uneven terrain. Even a slight amount of extension of the lift cylinders 40, 42 at such time could be magnified into considerable movement out at the front end of the header due to the extensive overhang of the header relative to the frame. Thus, the sickle 22 can be maintained at a more uniform and consistent cutting height, resulting in a smoother, more uniform cut. The biasing flotation force provided by the cylinders 34, 36 is generated by the dual accumulators 126 and 128, which are in open communication with the anchor ends of the cylinders 34, 36. If a relatively heavy header is attached to the tractor 12, the accumulator 128 (having the higher precharge pressure) will provide the biasing pressure on the pistons of the flotation cylinders 34 and 36 when the control system is in the MAINTAIN mode. In that instance, the lower pressure provided by the lower precharged accumulator 126 will be significantly exceeded so that the accumulator 126 has little, if any, effect on the heavy header.

However, if the light header is chosen for attachment to the tractor, the lower precharged accumulator 126 will come into play in the MAINTAIN mode while the higher precharged accumulator 128 will not. Since a lower pressure will be able to extend the pistons of the flotation cylinders 34, 36 against the weight of the lighter header, the higher precharge pressure of the accumulator 128 will most likely never be reached. On the other hand, the lower precharge pressure of the accumulator 126 will provide nearly enough pressure to lift the weight of the header, such that the header is biased upwardly by the accumulator 126.

Thus, although both accumulators 126 and 128 are always in open communication with the flotation cylinders 34 and 36 when the system is in the MAINTAIN mode, only that accumulator which actually matches the needs of the particular header chosen for use will come into play. There is no need to open or close a valve to select one accumulator or the other, such selection in effect occurring automatically depending upon the weight of the chosen header.

It will also be seen that because of the arrangement of the control system 56, the flotation circuit 54 and the lift circuit 52 do not interfere with one another. Instead, they complement and cooperate with one another to provide for excellent header flotation and reduced bounce, yet quick response when it comes time to raise the header out of its working position.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state their intent to rely on the Doctrine of Equivalents to determine and assess the reasonably fair scope of their invention as pertains to any apparatus not materially departing from but outside the literal scope of the invention as set out in the following claims.

We claim:

1. In a farm implement having a mobile frame to which a crop header may be attached, height control apparatus for the header comprising:

a charging circuit containing hydraulic fluid under pressure;

a lifting circuit including a master cylinder and a slave cylinder for exerting a pair of lifting forces at spaced locations on the header; and a control system between the charging circuit and the lifting circuit and selectively placeable in alternative lift, hold, or lower modes for either communicating the charging circuit with the lifting circuit in a manner to lift the header, blocking communication between the charging circuit and the lifting circuit to maintain the header at a selected height, or communicating the charging circuit with the lifting circuit in a manner to lower the header, said lifting circuit including a master cylinder flow path between the master cylinder and the control system, a connecting flow path between the master cylinder and the slave cylinder, and a slave flow path between the slave cylinder and the control system, said control system being operable to prevent flow from the master cylinder along the master cylinder flow path and to prevent flow from the slave cylinder along the slave flow path, when the control system is in the hold mode.

2. In a farm implement as claimed in claim 1, said control system including a check valve that is closed when the control system is in the hold mode for preventing flow from the slave cylinder along said slave flow path, said control system being operable to open said check valve when the control system is in either the lift or lower modes.

3. In a farm implement as claimed in claim 2, said control system further including a pilot line for opening said check valve and a control valve for controlling communication of the pilot line with the charging circuit, said control valve being operable to establish communication of the pilot line with a high pressure side of the charging circuit when the control system is in the lift mode.

4. In a farm implement having a mobile frame to which a crop header may be attached, height control apparatus for the header comprising:

a charging circuit containing hydraulic fluid under pressure;

a lifting circuit including a master cylinder and a slave cylinder for exerting a pair of lifting forces at spaced locations on the header;

a control system between the charging circuit and the lifting circuit and selectively placeable in alternative lift, hold, or lower modes for either communicating the charging circuit with the lifting circuit in a manner to lift the header, blocking communication between the charging circuit and the lifting circuit to maintain the header at a selected height, or communicating the charging circuit with the lifting circuit in a manner to lower the header, said lifting circuit including a master cylinder flow path between the master cylinder and the control system, a connecting flow path between the master cylinder and the slave cylinder, and a slave flow path between the slave cylinder and the control system, and a flotation circuit selectively communicatable with the charging circuit, said flotation circuit including at least one flotation cylinder and a gas-pressurized accumulator mechanism in fluid communication with the flotation cylinder, said control system further being placeable in a float mode for causing the accumulator mechanism and the flotation cylinder to exert yieldable upward flotation force against the header.

5. In a farm implement as claimed in claim 4, said flotation cylinder being operable to carry a majority of the weight of the header and the lift cylinders being operable to carry the balance of the weight of the header when the control system is in the lift mode.

6. In a farm implement as claimed in claim 5, said apparatus including operating linkage swingably connected to the frame and adapted for connection with the header, said flotation cylinder being operably coupled with said linkage for exerting said flotation force against the linkage, said lift cylinders being connected at one end with the frame and at the other end with support structure that underlies said linkage, said linkage being raisable off said support structure with the help of said flotation cylinder when a header attached to the linkage encounters rises in the terrain during operation of the implement.

7. In a farm implement as claimed in claim 6, said control system including a closed check valve for preventing flow from the slave cylinder when the control system is in the hold mode, said control system being operable to open said check valve when the control system is in either the lift or lower modes.

8. In a farm implement as claimed in claim 7, said control system further including a pilot line for opening said check valve and a control valve for controlling communication of the pilot line with the charging circuit, said control valve being operable to establish communication of the pilot line with a high pressure side of the charging circuit when the control system is in the lift mode.

9. In a farm implement as claimed in claim 1, said control system including a normally closed relief valve that is opened when the pressure within the master cylinder flow path exceeds a predetermined level for permitting flow from the master cylinder along the master cylinder flow path.

10. In a farm implement as claimed in claim 9, said relief valve being adjustable so as to permit user adjustment of the predetermined level.

* * * * *